United States Patent [19]

Theiler, Sr.

[11] 4,337,542
[45] * Jul. 6, 1982

[54] CRIMP TOOL WITH STATION FOR RIGHT ANGLE TERMINAL

[75] Inventor: Werner C. Theiler, Sr., Dix Hills, N.Y.

[73] Assignee: Minnesota Mining & Manufacturing Company, St. Paul, Minn.

[*] Notice: The portion of the term of this patent subsequent to Oct. 28, 1997, has been disclaimed.

[21] Appl. No.: 156,934

[22] Filed: Jun. 6, 1980

Related U.S. Application Data

[63] Continuation-in-part of Ser. No. 899,337, Apr. 24, 1978, Pat. No. 4,229,849.

[51] Int. Cl.³ ............................................. B25B 7/22
[52] U.S. Cl. ........................................ 7/107; 81/9.5 B; 140/106
[58] Field of Search .............. 7/107, 127; 81/9.5 R, 81/5.1 R; 140/106, 121

[56] References Cited

U.S. PATENT DOCUMENTS

| | | | |
|---|---|---|---|
| 3,120,773 | 2/1964 | Esser | 7/107 X |
| 3,525,107 | 8/1970 | Hays | 7/107 |
| 3,771,222 | 11/1973 | Sakuma | 7/107 X |
| 3,902,206 | 9/1975 | Naquin | 7/107 |
| 3,947,905 | 4/1976 | Neff | 7/107 |
| 4,006,502 | 2/1977 | Strickland | 7/107 |
| 4,028,756 | 6/1977 | Couto | 7/107 |
| 4,225,990 | 10/1980 | Theiler, Sr. | 7/107 |
| 4,229,849 | 10/1980 | Theiler, Sr. | 7/107 |

Primary Examiner—James G. Smith
Attorney, Agent, or Firm—Robert K. Youtie

[57] ABSTRACT

A terminal crimping tool including a pair of elongate members movable toward and away from each other and having longitudinal facing regions provided with a recessed configuration so as to be spaced apart when moved toward each other, and a pair of facing regions at one end of the longitudinal regions having a complementary receiver and indentor for crimping a terminal barrel with its connector between the first mentioned pair of facing regions.

10 Claims, 5 Drawing Figures

CRIMP TOOL WITH STATION FOR RIGHT ANGLE TERMINAL

CROSS-REFERENCES TO RELATED APPLICATIONS

This application is a continuation-in-part of my copending patent application Ser. No. 899,337 filed Apr. 24, 1978, now U.S. Pat. No. 4,229,849 entitled HAND CRIMP TOOL and assigned to Minnesota Mining and Manufacturing Company.

BACKGROUND OF THE INVENTION

As is well known to those versed in the art of electrical connectors and terminals, there are a number of such devices wherein a wire encompassing barrel is disposed generally transversely of or normal to the connector, such devices often being called right angle connectors or terminals. In crimping such barrels about their conductors, it has heretofore been the practice of providing tools with barrel crimping formations adjacent to the free ends of jaws to enable the connector to extend outward beyond the jaws, or to provide a crimping station wherein the transverse barrel of a right angle connector may extend longitudinal of the levers, with the remainder of the connector extending laterally from the levers.

In the former, the crimping force is necessarily minimized by the required crimping station location remote from the pivot, and in the latter it has been found difficult to achieve an effective crimping configuration, as well as crimping of a substantial range of barrel sizes.

The applicant is aware of the below listed prior art:

U.S. PATENTS

U.S. Pat. No. 1,042,318—Chamberlain
U.S. Pat. No. 1,939,574—Saylor
U.S. Pat. No. 3,654,647—Neff
U.S. Pat. No. 3,831,207—Boyajian
U.S. Pat. No. 2,967,303—Wise
U.S. Pat. No. 3,974,905—Neff
U.S. Pat. No. 4,028,756—Couto

WEST GERMAN PATENT

German Auslegeschrift No. 1,112,772

SUMMARY OF THE INVENTION

Accordingly, it is an important object of the present invention to provide a connector crimping tool advantageously well adapted for use with right angle terminals and connectors wherein a substantial crimping force may be applied at a location proximate to the lever pivot; wherein crimping is effected of a right angle barrel extending transversely of the levers to achieve a most desirable crimping action; wherein a wide range of right angle barrel sizes may be crimped without utilizing an unduly large portion of the tool; and which otherwise fully accomplishes its intended objects.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
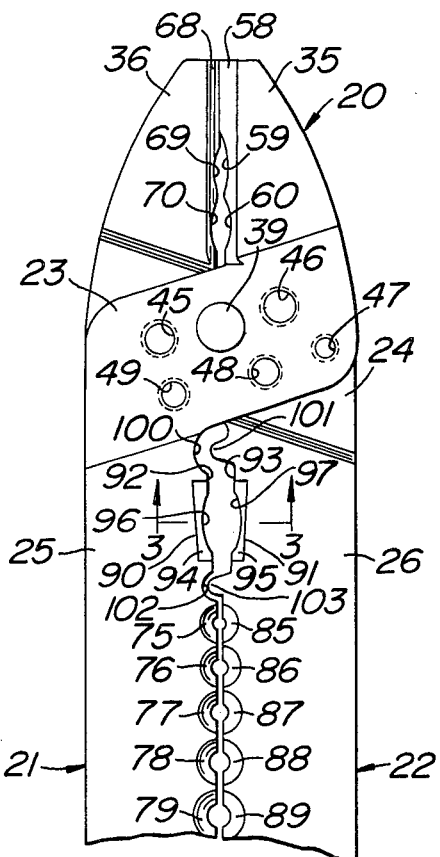
FIG. 1 is a partial longitudinal plan view showing one side of a tool of the present invention in closed condition.
Figure 2:
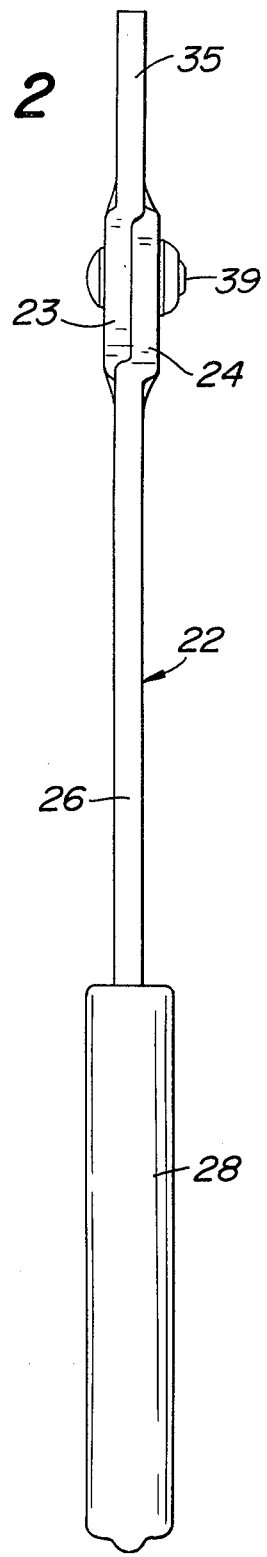
FIG. 2 is a longitudinal view taken from the right-hand side of FIG. 1.
Figure 3:
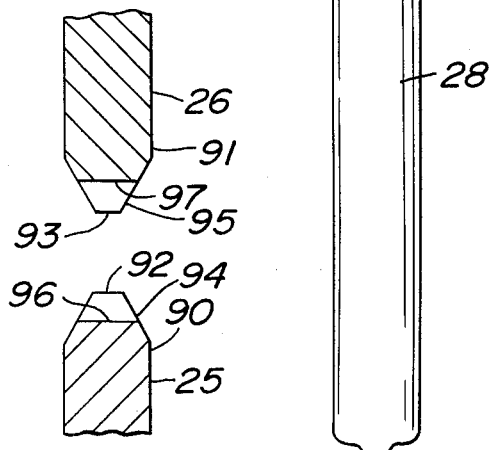
FIG. 3 is a partial transverse sectional view taken generally along the line 3—3 of FIG. 1.

Referring now more particularly to the drawings, and specifically to FIGS. 1 and 2 thereof, a tool is there generally designated 20 and may be generally of a plier-type including pivoted crossing elongate members 21 and 22 pivoted in their crossover regions, as by a pivot 39.

The elongate members 21 and 22 may each include a transversely extending crossing portion or part, as at 23 and 24, respectively. Extending from respective crossing parts 23 and 24 are elongate, substantially straight intermediate parts or lever arms 25 and 26, from which there may extend respective handles or hand grips, as at 28.

From the crossing parts 23 and 24, oppositely outwardly with respect to the levers arms 25 and 26, may extend a pair of jaw parts or jaws 35 and 36, respectively. In the closed tool condition of FIG. 1, the jaws 35 and 36 may extend in general parallelism with each other, while the lever arms 25 and 26 may extend in general parallelism with each other and with the jaws. Further, the lever arms 25 and 26 are generally coplanar with each other, and the jaws 35 and 36 are generally coplanar with each other and with the lever arms, while the crossing portions 23 and 24 are offset out of the plane of lever arms 25 and 26 and jaws 35 and 36 into overlying relation of the crossing portions with respect to each other.

The crossing portions 23 and 24 may be provided with bolt or rod cutoff stations 45–49, and the jaws 35 and 36 may be provided at their outer regions with a wire severance station including a cutting edge 58 and an anvil 68. Longitudinally inwardly of the wire cutoff station 58, 68, the facing jaw regions may be cut away, as at 59 and 69, and 60 and 70 to define barrel crimping stations.

Further, the lever arms 25 and 26 are formed on their facing regions with semi-circular countersunk formations 75–79 and 85–89 combining to define insulation cutting and stripping stations for removing the insulation from wires of various sizes.

As thus far described, the tool 20 may be essentially similar to that of said copending patent application.

Located on facing regions of the lever arms 25 and 26, between the crossover portions 23, 24, and the wire stripping stations 75, 85, are formations for crimping flag-type or right angle type terminals and connectors of a wide range of sizes.

More specifically, a pair of facing lever arm regions 90 and 91 extend generally longitudinally of the lever arms, and have their facing edges 92 and 93 located in facing, spaced apart relation when the lever arms are moved into their limiting position of movement toward each other, as when the cutoff station 58, 68 is fully closed. In order to maintain this spaced relationship between facing surfaces 92 and 93, at least one of the surfaces may be recessed into its lever arm. For example, the inner arm surface 93 is illustrated as being recessed into its lever arm 26.

Preferably the facing lever arm portions 90, 91 are both formed with bevels or tapers, as at 94 and 95, respectively converging or tapering toward the edge surfaces 92 and 93. The convergent or tapering regions 94 and 95 are arcuately notched or cut away, as at 96 and 97 to define additional crimping formations, as for a barrel of size range different from that accommodated by the crimping stations 59, 69 and 60, 70.

Further, the longitudinal edge surfaces 92 and 93 of the facing regions 90 and 91 extend in a non-parallel, angulate or diverging relation with each other in the direction toward the pivotal connection 39 when the lever arms 26 and 26 are moved to their limiting position toward each other. This may be considered as a negative angular relation between the facing regions 90 and 91, being convergent in the longitudinally outward direction to, in a measure, compensate for the longitudinal outward divergence of the lever arms 25 and 26 in all but their limiting positions of movement toward each other. By this negative included angle between facing regions 90 and 91, and the spacing therebetween, it is possible to crimp relatively large insulated terminals, for example #8 and #6 AWG, obtaining the desired strength of crimp and pull resistance to separation. Also, the negative angle serves to produce a more symmetrical or equalized crimp across the entire width of the barrel to eliminate or minimize local weakening of insulation and resulting dielectric failures; and further, the negative angle eliminates the tendency heretofore of terminals to move away from the pivotal connection during crimping.

Adjacent to one end of the facing, spaced apart formations 90, 91, say inward toward the pivot 39, there may be formed on one lever arm a generally arcuate cutout or receiver 100 providing a cavity facing toward the other arm portion 91. Directly opposite to the cavity or receiver 100, the arm portion 91 is provided on its inner edge with a protuberance or bulge 101 which projects toward the interior of and terminates short of the receiver 100. The protuberance or bulge 101 is configured complementary to the receiver or cutout 100, so as to accommodate a range of terminal barrels in the receiver for crimping by the protuberance 101 by movement together of the arms 25 and 26.

At the opposite end of lever portion 90, between the latter and stripping stations 75, 85, the edge 92 is formed with a cutout, notch or receiver 102 facing generally toward the inner side edge 93 of arm portion 91. Opposite to and facing toward receiver 102, the portion 91 of arm 26 is formed on inner edge 93 with a protuberance or bulge 103, which projects toward and terminates short of the interior surface of receiver 102. The cutout or notch 102 is smaller than the cutout or notch 100, so as to accommodate connector barrels smaller than those accommodated by the receiver 100. The protuberance or bulge 103 is configured to satisfactorily crimp barrels sized to be received by receiver 102.

The smaller barrels accommodated by the complementary crimping formations 102, 103 are effectively crimped with less force than the larger barrels received in crimping formations 100 and 101. Hence, the crimping formations 102, 103 may be located further from the pivot 39 than the crimping formations 100, 101 to achieve maximum mechanical advantage where desired.

Figure 4:
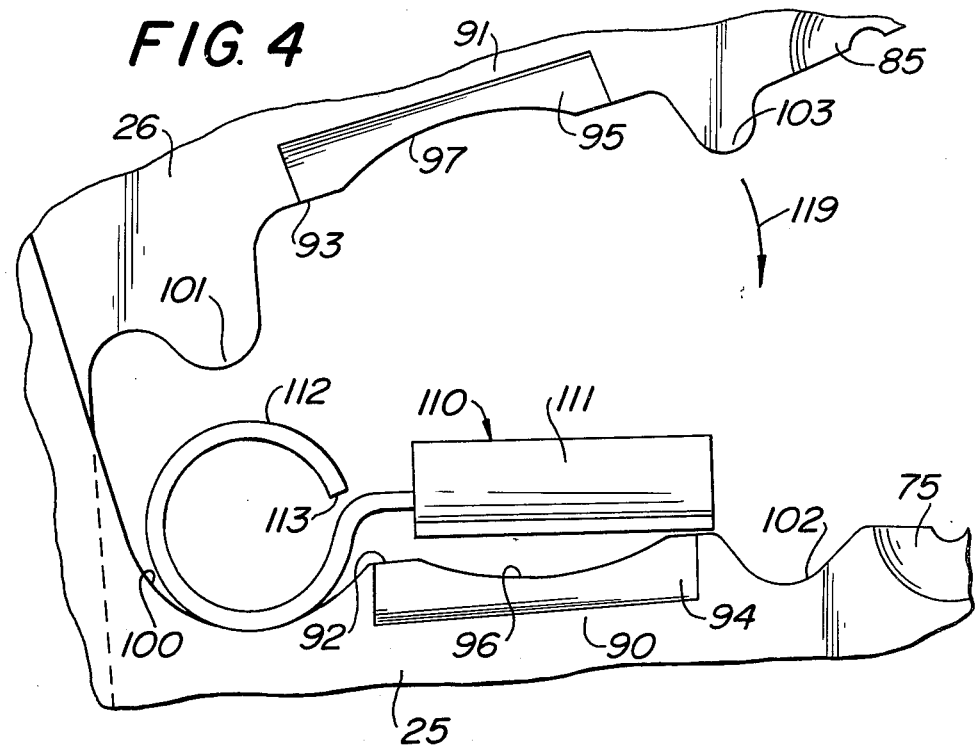
FIG. 4 is an enlarged partial longitudinal plan view similar to FIG. 1, but illustrating the tool open in position about to crimp a relatively large right angle connector.
Figure 5:
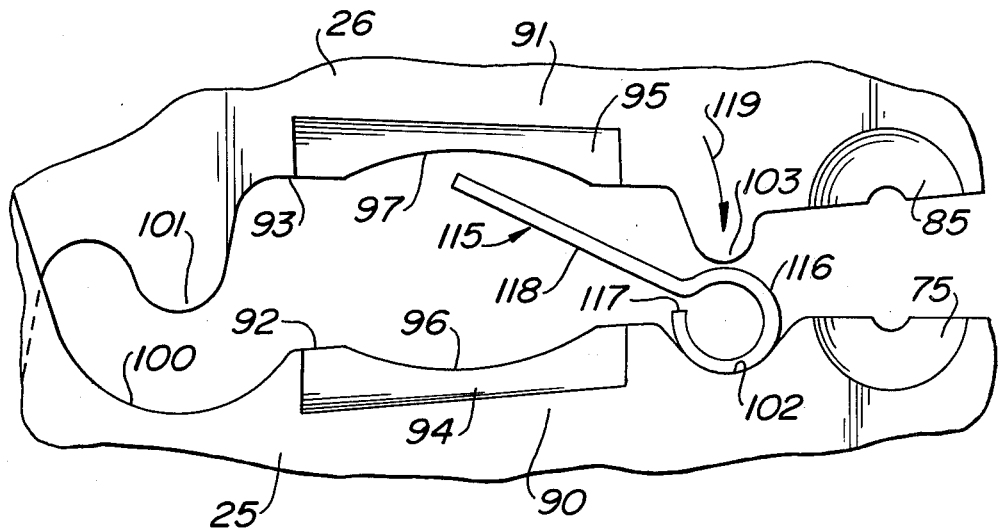
FIG. 5 is a partial enlarged longitudinal plan view showing the tool in position about to crimp a smaller right angle connector.

The operation is best seen in FIGS. 4 and 5. A relatively large terminal 110 is shown in FIG. 4 of the transverse or right angle barrel type, wherein a longitudinally extending connector 111 is integrally formed with a barrel 112 at one end of the connector with its axis normal to the connector. Of course, the connector 111 may be a tab, hook, spade or any desired type.

In order to crimp the barrel 112, it is initially seated in the concave receiver or female nest 100, with the connector 111 extending to lie in the space between facing arm regions 90 and 91. It is preferable to arrange the barrel 112 with its free end 113 adjacent to the receiver or nest 100, for better crimping action by indentor or protuberance 101. This preferred orientation is not shown in FIG. 4, but would be achieved by inverting the terminal 110 of FIG. 4 to the arrangement shown in FIG. 5.

In either arrangement of terminal 110 for crimping, the connector 111 is located between the longitudinally extending facing arm regions 90 and 91, and more specifically may be received in the recess 93 between indentors 101 and 103 upon full crimping closure of the arms 25 and 26. Thus, the connector 111 is received between the arms 25 and 26 upon complete crimping closure of the arms without impediment to the crimping operation.

The operation shown in FIG. 5 is similar, a terminal 115 of the transverse or right angle barrel type is shown being operated upon by the receiver or female nest 102 and indentor or protuberance 103. The barrel 116 of terminal 115 is engaged in the receiver 102 with its free end 117 in the preferred location, adjacent to the receiver. Extending integrally from the barrel 116 is the terminal connector 118, into the space between facing arm regions 90 and 91. Upon continued closing movement of the arms 25 and 26, as by movement of arm 26 in the direction of arrow 119, the barrel 116 is indented and crimped by protuberance 103, being retained closed by receiver 102, and the connector 115 may enter into recess 93 of arm region 91 so as not to impede full crimping movement of arm 26.

Thus, it will be seen that there are provided differently sized complementary crimping formations for different size ranges of terminals, the complementary crimping formations 100 and 101 being larger than the complementary crimping formations 102 and 103. Further, the complementary crimping formations may be located at desired distances from the pivot for requisite crimping force and minimum tool length, while accommodating to a greatly increased range of barrel sizes adapted to be crimped. In addition, the crimping edges or surfaces 96 and 97 serve to crimp terminal barrels in the manner of 59, 69, 60 and 70, but of a different barrel size range, for further increased tool versatility.

From the foregoing, it is seen that the present invention provides a terminal crimping tool which is uniquely well-adapted for crimping right angle terminals of a wide range of sizes and with requisite crimping force, while being of minimum size and reasonable cost, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A tool for crimping a terminal having a connector and a transverse barrel at one end of the connector, said tool comprising a pair of pivotally connected levers movable toward and away from each other, a first pair of facing regions longitudinally on said levers and provided with an overall recessed configuration so as to be spaced apart to receive the connector when said levers are moved toward each other, a second pair of facing regions on said levers at one end of said first pair of facing regions, initial complementary receiver and indentor means on said second pair of facing regions for crimping a terminal barrel of one size range with its connector protectively received between said first pair of facing regions, a third pair of facing regions on said levers at the other end of said first pair of facing regions, and additional complementary receiver and indentor means on said third pair of facing regions for crimping a terminal barrel of another size range with its connector protectively received between said first pair of facing regions.

2. A tool according to claim 1, said first pair of facing regions having concave surfaces for crimping engagement with longitudinal terminal barrels.

3. A tool according to claim 1, said recessed configuration being located in at least one of said levers.

4. A tool according to claim 1, said initial and additional receiver and indentor means each being defined by an arcuate cutout in the respective lever, and a protuberance on the respective lever in facing spaced relation with the associated cutout.

5. A tool according to claim 4, said cutouts being located in one lever, and said protuberances being located in the other lever.

6. A tool according to claim 5, said recessed configuration being located in said other lever between said protuberances.

7. A tool according to claim 4, said cutouts being arcuate and opening transversely through respective levers.

8. A tool according to claim 7, said first pair of facing regions having concave surfaces of reduced area for crimping engagement with longitudinal barrel terminals.

9. A tool for crimping a terminal having a connector and a transverse barrel at one end of the connector, said tool comprising a pair of pivotally connected levers movable toward and away from each other, a first pair of facing regions longitudinally on said levers and provided with a recessed configuration so as to be spaced apart when said levers are moved toward each other, a second pair of facing regions on said levers at one end of said first pair of facing regions, initial complementary receiver and indentor means on said second pair of facing regions for crimping a terminal barrel of one size range with its connector protectively received between said first pair of facing regions, a third pair of facing regions on said levers at the other end of said first pair of facing regions, and additional complementary receiver and indentor means on said third pair of facing regions for crimping a terminal barrel of another size range with its connector protectively received between said first pair of facing regions, said first pair of facing regions having concave surfaces for crimping engagement with longitudinal terminal barrels, said first pair of facing regions diverging from each other in the direction toward the pivotal connection of said levers when the latter are moved to their limiting position toward each other, for equalized crimping of a longitudinal terminal barrel across its width without the barrel tending to shift away from the pivotal connection.

10. A tool according to claim 9, said second pair of facing regions being located proximate to the pivotal connection of said levers and said third pair of proximate regions being located remote from the pivotal connection of said levers, said second pair of facing regions being larger than said third pair of facing regions to accomodate larger terminal barrels in said second pair of facing regions and apply greater force by the greater leverage.

* * * * *